United States Patent Office 3,711,536
Patented Jan. 16, 1973

3,711,536
o-(α-HYDROXYALKYL)PHENYL N-METHYL
CARBAMATES
Gustav K. Kohn, Berkeley, Calif., assignor to Chevron
Research Company, San Francisco, Calif.
No Drawing. Filed Mar. 24, 1971, Ser. No. 127,779
The portion of the term of the patent subsequent to
July 25, 1989, has been disclaimed
Int. Cl. C07c 125/06
U.S. Cl. 260—479 C      3 Claims

ABSTRACT OF THE DISCLOSURE o-(α-Hydroxyalkyl)phenyl N-methyl carbamates of the formula

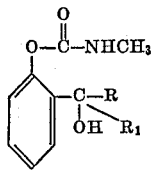

wherein R is hydrogen or methyl and $R_1$ is ethyl or propyl, with the proviso that the total number of carbon atoms for R and $R_1$ taken together is 3. The above carbamates find use as insecticides.

BACKGROUND OF THE INVENTION

Field

The present invention relates to insecticidal carbamates. More particularly, the present invention is concerned with o-α-hydroxyalkylphenyl N-methyl carbamates and their use in the control of insects.

Prior art m-Alkylphenyl N-methyl carbamates are well known in the art as agricultural pesticides, particularly for their effectiveness as digestive and/or contact toxicants which inhibit the cholinesterase enzyme system of the parasite. See for example U.S. Pat. Nos. 3,062,707; 3,062,864; 3,062,865; 3,062,866; 3,062,867; 3,062,868; 3,066,163; 3,076,741 and 3,110,726.

DESCRIPTION OF THE INVENTION

Carbamates of the present invention find use in pesticide control and are represented by the formula

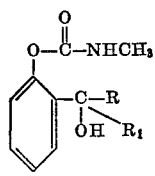

wherein R is hydrogen or methyl and $R_1$ is ethyl or propyl (n- or iso), with the proviso that the total number of carbon atoms for R and $R_1$ taken together is 3, i.e. that when $R_1$ is propyl, R is hydrogen.

Representative compounds of the present invention are o-(1-hydroxypropyl)phenyl N-methyl carbamate, o-(1-hydroxybutyl)phenyl N-methyl carbamate, o-(1-hydroxy-2-methyl)phenyl N-methyl carbamate, o-(2-hydroxy-2-butyl)phenyl N-methyl carbamate.

Compounds of the present invention are prepared by reacting an appropriate phenol with methyl isocyanate according to the following equation:

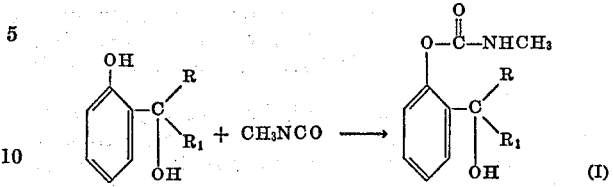

Generally, equimolar amounts of the phenol and the isocyanate will be used. The amount of the isocyanate should not exceed about 1.1 moles per mole of phenol. Generally, a small amount of triethylamine or other suitable organic base is added. The reaction is generally run in the presence of a solvent such as dimethoxy or methylene chloride. The amount of solvent will range from 2 moles to 20 moles per mole of phenol. The reaction temperature will range from 20° C. to 85° C. and the reaction time ½ to 72 hours.

The phenol of reaction (I) above can be obtained commercially or it can be prepared by the well-known reaction of a o-hydroxyphenyl methyl ketone or o-hydroxybenzaldehyde with an appropriate Grignard reagent. The Grignard reagent may be, e.g., ethyl magnesium bromide or propyl magnesium bromide. The reaction is generally run at a temperature of from 0° C. to 10° C. Generally, magnesium turnings will be mechanically stirred with the appropriate hydrocarbyl bromide to form the Grignard reagent; then the ketone added. The product can be recovered by the addition of water and extracted with ether.

If desired, the o-hydroxyphenyl methyl ketone or o-hydroxybenzaldehyde can be prepared by the well-known reaction of acid halide with phenol in the presence of aluminum trichloride, etc.

The present invention may be more fully understood by reference to the following examples:

EXAMPLE 1

Preparation of o-(2-hydroxy-2-butyl)phenyl
N-methyl carbamate

To a vigorously stirred solution of 10 g. (0.412 mole) of magnesium turnings in 250 ml. of diethyl ether there was added a small portion of a solution of 45 g. (0.412 mole) of ethylbromide in 100 ml. of diethyl ether. After a short time, a crystal of iodine was added, and then the remainder of the ethylbromide solution was added over a period of one hour. During this time the reactants were maintained at a gentle reflux temperature. When all of the bromide solution was added, the mixture was stirred at room temperature for ½ hour.

A solution of 27 g. (0.2 mole) of o-hydroxyacetophenone dissolved in 200 ml. of diethyl ether was then added over a period of 1 hour, and then the desulting mixture was stirred at room temperature for an additional hour. At the end of this time, the mixture was cooled to 0° C., and 250 ml. of saturated aqueous ammonium chloride was slowly added. After filtration, the phases were separated and the dried organic layer was evaporated to give a crude liquid product. This material was chromatographed on silica gel using first a 95/5 and then a 50/50 hexane/diethyl ether solution as the eluant. The fractions containing the product were combined and evaporated to give 16.5 g. of o-(2-hydroxy-2-butyl)phenol.

The phenolic product obtained as above, 12 g. (0.072 mole) was dissolved in 50 ml. of dimethoxyethane to which was added 4.12 g. (0.072 mole) of methyl isocyanate and 2 ml. of triethylamine. The resulting solution was refluxed for 40 hours. At the end of this time the solvent was removed by evaporation and replaced by an equal amount of dichloromethane. After washing and drying the solvent was evaporated off to give an oily crude product. Purification by chromatography over silica gel using ether-hexane solution as the eluant gave 16 g. of o-(2-hydroxy-2-butyl)phenyl N-methyl carbamate.

*Analysis.*—Calcd. for $C_{12}H_{17}NO_3$: N, 6.3%. Found: N, 5.8%. The infrared spectra had strong adsorption bands at 760, 920, 1100, 1200, 1340, 1440, 1480, 1530, 1700, 2980, and 3300 cm.$^{-1}$. The NMR spectra was consistent with the assigned structure.

Other compounds were made by essentially the same procedure starting with either o-hydroxybenzaldehyde or o-hydroxyacetophenone. These compounds are listed in Table I.

TABLE I

| Compound | Physical state | Analysis, percent N | |
|---|---|---|---|
| | | Calculated | Found |
| o-(1-hydroxy-2-methylpropyl)-phenyl N-methyl carbamate. | Oil | 6.3 | 6.4 |
| o-(1-hydroxypropyl)phenyl N-methyl carbamate. | ...do | 6.7 | 6.9 |

In addition to the specific formulations and application techniques described below, one or more of the carbamates of the present invention may be applied in other liquid or solid formulation to the insects, their environment, or hosts susceptible to insect attack. For example, they may be sprayed or otherwise applied directly to plants or soil so as to effect control of insects coming into contact therewith.

Formulations of the compounds of this invention will comprise a toxic amount of one or more carbamates and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, eiher solid or liquid carriers, will be dependent upon many factors, such as the particular carbamate compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 50 percent by weight or higher. Economically, of course, it is desirable to use lower concentrations of this active ingredient. Thus, it is usually desirable to use less than 20 percent by weight of the active ingredient in a particular composition.

The terms "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other related classes of arthropods whose members are segmented invertebrates having more or fewer than six legs, such as spiders, mites, ticks, centipedes, worms and the like.

To show the insecticidal activity of the compounds of the present invention, two representative compounds were tested in their control of American cockroaches (*Preiplaneta americana* L.)

For the insecticidal test, 500 p.p.m. acetone solution of the candidate toxicant was placed in a microsprayer (atomizer). A random mixture of anesthetized male and female roaches was placed in a container and 55 mg. of the above-described acetone solution was sprayed on them. A lid was placed on the container. A mortality reading was made after 24 hours. The test results showed that for o-(2-hydroxy-2-butyl)phenyl N-methyl carbamate the control was 100%. For the other candidate toxicant, namely o-(1-hydroxy-2-methylpropyl)phenyl N-methyl carbamate, the control was 98%.

As will be evident to those skilled in the art, various modifications on this invention can be made or followed, in the light of the foregoing disclosure and discussion, without departing from the spirit or scope of the disclosure or from the scope of the following claims.

I claim:

1. Compound of the formula

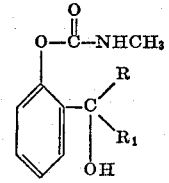

wherein R is hydrogen or methyl and $R_1$ is ethyl or propyl, with the proviso that the total number of carbon atoms for R and $R_1$ taken together is 3.

2. Compound of claim 1 wherein R is hydrogen and $R_1$ is isopropyl.

3. Compound of claim 1 wherein R is methyl and $R_1$ is ethyl.

References Cited

UNITED STATES PATENTS 3,470,236  9/1969  Hausweiler et al. _____ 260—479

JAMES A. PATTEN, Primary Examiner

U.S. Cl. X.R.

424—300